United States Patent [19]
Yabuta et al.

[11] 3,736,031
[45] May 29, 1973

[54] HYDRAULIC BRAKE FLUID PRESSURE PROPORTIONING VALVE

[75] Inventors: Keiichiro Yabuta, Asahi-ku, Yokohama; Kaname Doi, Itame, both of Japan

[73] Assignees: Nissan Motor Company Limited, Yokohama and Sumitomo Electric Industries, Limited, Osaka, both of Japan

[22] Filed: July 6, 1972

[21] Appl. No.: 269,455

[30] Foreign Application Priority Data

Aug. 30, 1971 Japan..............................46/66404

[52] U.S. Cl......................303/6 C, 188/152, 200/82, 303/84 A
[51] Int. Cl................................................B60t 8/26
[58] Field of Search..........................303/6 C, 84 A; 60/54.5; 200/82; 188/151, 152

[56] References Cited

UNITED STATES PATENTS

| | | | |
|---|---|---|---|
| 3,448,230 | 6/1969 | Bueler | 303/6 C X |
| 3,597,008 | 8/1971 | Falk | 303/6 C |
| 3,667,810 | 6/1972 | Silagy | 303/6 C |

*Primary Examiner*—Allen N. Knowles
*Assistant Examiner*—Michael Mar
*Attorney*—John Lezdey

[57] ABSTRACT

A hydraulic brake fluid pressure proportioning valve adapted to be interposed in a dual brake system between a tandem master cylinder and rear brake cylinders for modulating the fluid pressure to be transmitted to the rear brake cylinders. The brake fluid pressure proportioning valve includes a housing having first and second inlet ports communicating with front and rear brake fluid pressure sections of the tandem master cylinder, respectively, an outlet port communicating with the rear brake cylinders and a first chamber for providing fluid communicator between the second inlet port and the outlet port to pass an unmodulated fluid pressure from the second inlet port to the outlet port when a fluid pressure in the second inlet port is lower than a predetermined point of transition. The brake fluid pressure proportioning valve also includes a pressure responsive differential piston which is axially slidably accommodated in the second chamber and which has an upper stem portion extending into the second chamber, a valve head and a lower stem portion. A valve member is operatively disposed in the first chamber and cooperative with the valve head of the differential piston to control the fluid communication between the second inlet port and the outlet port thereby to modulate the fluid pressure to be delivered to the outlet port when the fluid pressure at the second inlet port reaches the predetermined point. A sealing member is disposed in the second chamber for sealing the second chamber from the first chamber so that a failure in the front brake pressure will modify the functioning of the differential piston.

9 Claims, 8 Drawing Figures

Fig. 4
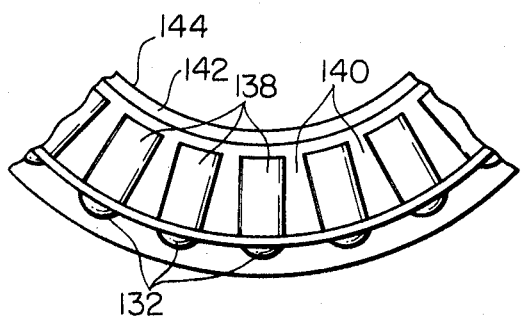
Fig. 5
Fig. 6
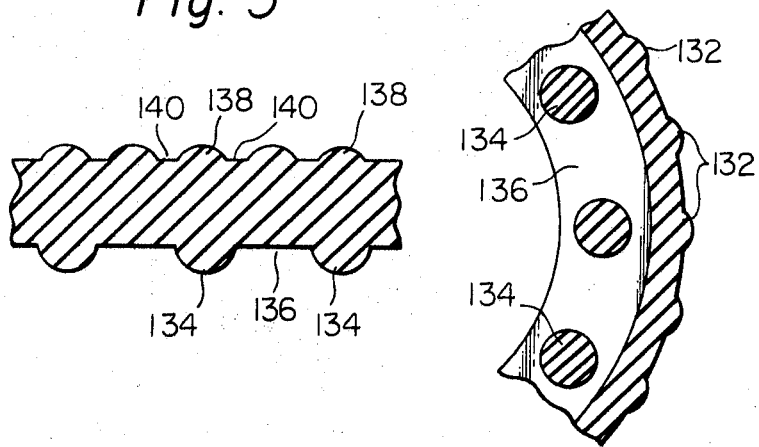

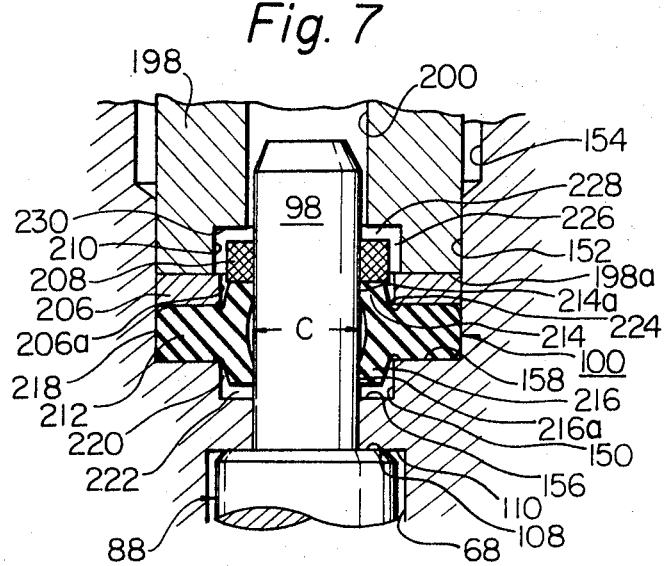
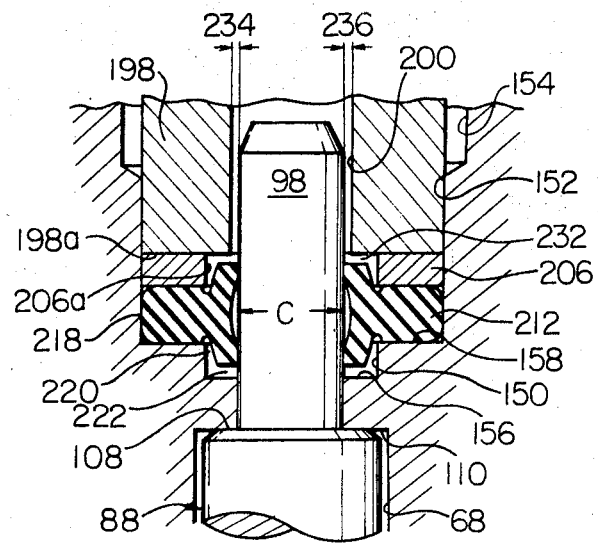

HYDRAULIC BRAKE FLUID PRESSURE PROPORTIONING VALVE

This invention relates to vehicular hydraulic brake fluid systems and more particularly to a brake fluid pressure proportioning valve for varying the hydraulic pressure to be delivered to the rear brakes as compared to the hydraulic pressure to be delivered to the front brakes.

It is well known in the art that the proportion of the weight of a vehicle that is born by the wheel of a given axle or a given pair of wheels does not remain static. This is because of the fact that during rapid deceleration a significant portion of the weight of the vehicle is transferred from the rear wheels to the front wheels by the action of moment of inertia resulting from the deceleration. The amount of the weight transfer for a given vehicle is proportionally varied in accordance with the magnitude of the deceleration.

The rate of deceleration of the vehicle is dependent upon the weight carried by that particular vehicle and the condition of the road surface on which the vehicle runs on and the rate of deceleration decreases as the total weight of the vehicle is increased or the road surface becomes more slippery. In addition to these factors, the rate of deceleration of the vehicle is further varied by other several factors.

As already described hereinabove, the amount of the weight transfer is varied in accordance with the variation in the rate of deceleration, so that it is difficult to actuate the front and rear brakes in a manner to produce equal sliding tendencies for its front and rear wheels under substantially all road conditions and rates of deceleration. To solve this problem, the front and rear brake cylinders of the vehicle are so sized as to apply forces to the front and rear brakes which are of the desired ratio to provide a balanced braking effort at a given rate of deceleration. During extremely rapid deceleration or panic brake applications, however, an excess amount of braking force is applied to the rear wheels so that the driver loses directional control over the vehicle and invites a serious danger to the vehicle occupants.

To prevent the risk of this occurring, various devices have heretofore been proposed which serve to proportionally reduce the hydraulic pressure to be applied to the rear brakes as compared with the hydraulic pressure to be applied to the front brakes during rapid deceleration. One typical example of such devices is a brake pressure proportioning valve which is interposed in the fluid pressure line or circuit leading to the rear brakes in a manner well known.

In a known motor vehicle, a simple brake system is employed which is so arranged as to deliver the hydraulic brake pressure both to the front and rear brake cylinders concurrently through a series of fluid pressure lines from a single source of hydraulic pressure, that is, a master cylinder. It is sometimes experienced in this prior single brake system that failure of one component of the brake system makes the brakes inoperable.

In order to overcome this drawback encountered in the prior art, it has been proposed and put into practice to have the brake system divided into at least two independent fluid circuits, so that even in the event of one circuit failing the other circuits are still left intact. The brake system having such two or more independent fluid circuits is called a dual hydraulic brake system with one or more tandem master cylinders. The tandem master cylinder has one section communicating with the brake cylinders of the front brakes and a second section communicating with the fluid circuit of the rear brakes, the brake pressure proportioning valve being interposed in the fluid circuit between the tandem master cylinder and the rear brake cylinders. Such a dual hydraulic brake system has an advantage in that, upon failure in one fluid circuit or one section of the tandem master cylinder, the other fluid circuit remains effective to slow down the vehicle.

If, now, it is desired to have the prior art pressure proportioning valve combined with the dual brake system, a problem is encountered in which only a reduced fluid pressure is transmitted to the rear brake cylinders in the event a failure in the fluid lines leading to the front brake cylinders. When any of the fluid lines to the front brake cylinders fails for one reason or another, only the rear brakes are responsible for the braking, with the front brakes inoperable. Since, however, the fluid pressure to be delivered to the rear brake cylinders has been reduced by the pressure proportioning valve, the rear brakes receive a pressure which is determined by merely for the purpose of preventing the rear wheels from being locked when the brake pedal is depressed hard. The braking effort exerted by the rear brakes is, as a consequence, insufficient for the desired deceleration of the vehicle, thus endangering the vehicle occupants.

To compensate for this disadvantage encountered in the prior art dual brake system, various attempts have heretofore been made to the brake pressure proportioning valve with a view to providing a maximum braking efficiency. To this end, the brake proportioning valve is so constructed as to proportionally reduce the brake pressure to be delivered to the rear brake cylinders when the front and rear brake systems operate completely and to lose the pressure regulating function thereby to cause the fluid pressure transmitted from the master cylinder to be directly passed to the rear brake cylinders in the event the front brake system fails.

A prior art brake pressure proportioning valve of the type above described has a pressure responsive differential piston movable against a spring means in a valve body or having and connected in the fluid circuit leading to the rear brakes, this differential or stepped piston subdividing a cylinder bore into first and second chambers communicating with the master cylinder section associated with the rear brakes and the rear brake cylinders, respectively. The valve body also has a third fluid chamber which is in communication with the master cylinder section associated with the front brakes and the front brake cylinders. The differential piston is provided with valve means providing fluid communication between first and second fluid chambers during initial brake operation wherein the differential piston is retained against movement by the force of the spring means. The differential piston has a first effective cross sectional area exposed to rear system master cylinder pressure after closure of the valve means, a second effective area exposed to rear brake pressure after closure of the valve means and a third effective area exposed to front system brake pressure. During initial application of the brakes, the differential piston is retained in a position to cause the valve means to provide fluid communication between the master cylinder section and the rear brake cylinders by the force of the spring means. As the brake pressure to be carried to the rear brake cylinders reaches a predetermined value, the differential piston is moved to another position to decrease the opening condition of the valve means thereby to reduce the brake pressure to be transmitted to the rear brake cylinders, whereby a greater braking force may be achieved before skid conditions are reached. Upon failure in the front brake system, the fluid pressure is not applied to the third effective area of the differential piston, so that the differential piston is moved toward the position in which the valve means is opened to directly pass the fluid pressure from the master cylinder to the rear brake cylinders.

In order to prevent malfunctions of the pressure proportioning valve, there is provided in the pressure proportioning valve a sealing member which serves to seal the third effective area of the pressure proportioning valve from its first and second effective sectional areas so that a failure in the front brake pressure will lose the pressure regulating function by the valve means. The magnitude of the pressure acting on this sealing member is varied in the event the front and rear brake systems operated completely and in the event the front brake system fails, resulting in various modes of deformation of the sealing member. The greater the difference in modes of deformation of the sealing member the greater is the frictional resistance of the sealing member and, accordingly, the frictional wear of the sealing member is increased. Failure of this sealing member leads to unreliability in operation of the vehicular brake system.

It is, therefore, an object of the present invention to provide an improved brake pressure proportioning valve for proportionally reducing the hydraulic pressure applied to the rear brakes as compared with the hydraulic pressure applied to the front brakes when a predetermined deceleration is reached.

Another object of the present invention is to provide a hydraulic brake pressure proportioning valve which is adapted to be incorporated in a dual brake system of a vehicle.

A still another object of the present invention is to provide a hydraulic brake pressure proportioning valve for use in a dual brake of f a vehicle which valve is reliable in operation, easy to assemble and inexpensive to manufacture.

A further object of the present invention is to provide a hydraulic brake pressure proportioning valve for use in a dual brake system of a vehicle in which, even though a failure has taken place in any of the fluid circuits, the brakes of the remaining fluid circuits still remain operable to exert sufficient braking effort thus saving the vehicle occupants from a danger of collisions.

A still further object of the present invention is to provide a hydraulic brake pressure proportioning valve which is so constructed as to minimize the frictional wear of a sealing member disposed around a differential piston of the brake pressure proportioning valve, whereby the durability of the brake pressure proportioning valve is prolonged.

A yet further object of the present invention is to provide a hydraulic brake pressure proportioning valve incorporating a novel elastomeric sealing member having a specific configuration to reduce the frictional resistance.

A yet further object of the present invention is to provide a hydraulic brake pressure proportioning valve in which a sealing member surrounding a differential piston is subjected to a unique deformation.

In order to achieve these objects of the present invention, the present invention contemplates to provide a hydraulic brake pressure proportioning valve which is adapted to be interposed in a dual brake system between a tandem master cylinder and at least one of rear brake cylinders for the purpose of modulating the fluid pressure to be delivered to the rear brake cylinders. The brake pressure proportioning valve includes a housing having first and second inlet ports and an outlet port, the first and second inlet ports being connected to the front and rear brake sections of the tandem master cylinder, respectively, and the outlet port being connected to the rear brake cylinders. The housing also has formed therein a first chamber for providing fluid communication between the second inlet and outlet ports to pass an unmodulated fluid pressure from the second inlet port to the outlet port when a fluid pressure prevailing in the second inlet port is lower than a predetermined level at a predetermined point of transition. A pressure responsive differential piston is axially slidably accommodated in the first chamber for controlling fluid communication between the second inlet and outlet ports. The differential piston has a valve head on its middle peripheral wall, an upper stem portion terminating in a passage communicating with the first inlet port and a lower hollow stem portion internally maintained at an atmospheric pressure. An annular valve member is operatively disposed in the chamber and is cooperable with the valve head of the differential piston for restricting the flow of fluid from the inlet port to the outlet port during a predetermined of fluid pressure at the outlet port. This annular valve member has an inner annular peripheral surface with which the valve head of the differential piston is sealingly engageable to block the fluid communication between the first inlet and outlet ports thereby to reduce the fluid pressure at the outlet port. A compression spring is disposed in the chamber for biasing the differential piston to a position in which the valve head thereof is unseated from the valve member for permitting the second inlet port to communicate with the outlet port. The housing is further provided with a second chamber in which a seal member is operatively provided for sealing the upper stem portion of the differential piston from the remaining portions including valve head and the lower stem portion so that a failure in front brake pressure will substantially modify the functioning of the differential piston. In a preferred embodiment, the seal member includes an annular O-ring portion sealing adjacent component parts from each other. The seal member also includes first and second sealing flanges which are integral with the O-ring portion. The first sealing flange has a lip portion which is inclined angularly upwardly. The second sealing flange has a lip portion which is inclined angularly downwardly. When the sealing member is fitted in the second chamber, the lip portions of respective flanges of the seal member are deflected radially outwardly slightly by the engagement of their inner peripheries with the outer periphery of the upper stem portion of the differential piston to provide proper sealing function. The sealing member is held in place within the second chamber by an annular shoulder formed in the housing between the first second chambers and a longitudinal extension of an end closure member by which the second chamber is closed. Between the extension of the end closure member and the sealing member is disposed a thrust washer which prevents the sealing member from being subjected to a twisting moment or torsional stress when the end closure member is screwed into the housing. The inner diameter of the thrust washer is such that the clearance between the inner diameter of the thrust washer and the joint portion of the seal member is minimum to satisfactorily prevent one of the first and second flanges of the seal member from being excessively radially outwardly deflected. A back-up ring is disposed in the second chamber adjacent the lip portion of the first flange of the seal member to prevent excessive upward deflection of the first flanges.

These and other features and advantages of the present invention will become more apparent from the following description when taken in conjunction with the accompanying drawings in which:

FIG. 4 is a sectional view of the structure illustrated in FIG. 3 taken along the line 4—4;

Figure 3:
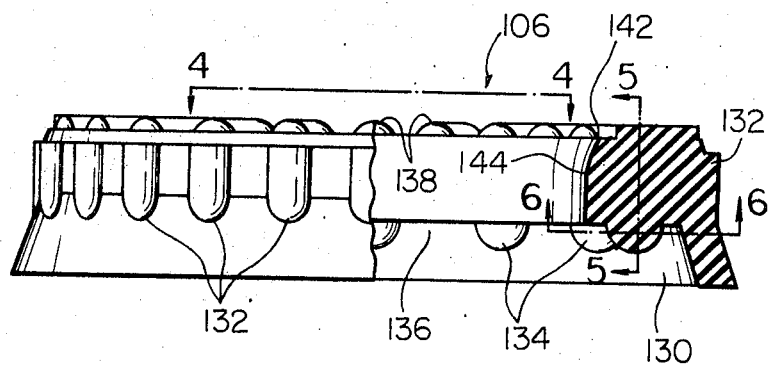
FIG. 3 is an enlarged view partly in section and partly in elevation of one of the parts of the structure shown in FIG. 2.
Figure 2:
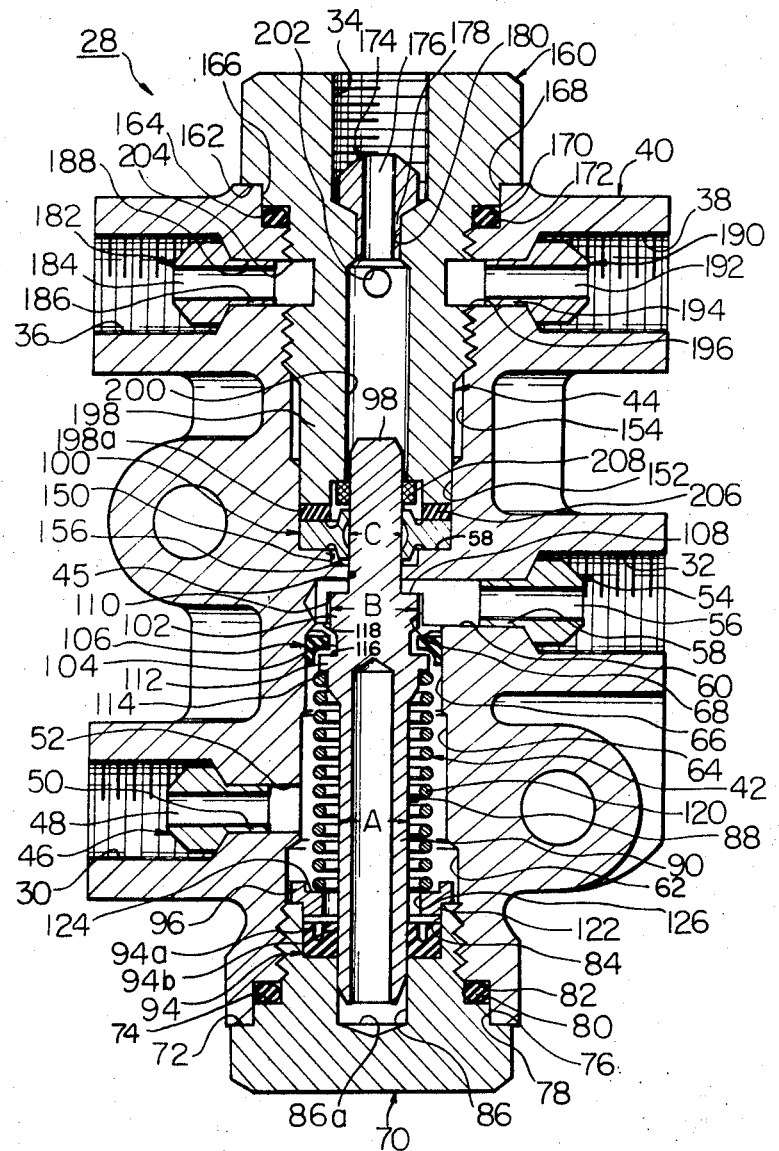
FIG. 2 is a cross sectional view of the hydraulic brake pressure proportioning valve of the present invention as shown in FIG. 1.

FIGS. 5 and 6 are enlarged sectional views of the structure shown in FIG. 3 taken along the lines 5—5 and 6—6 thereof, respectively;

FIG. 7 is an enlarged sectional view of another one of parts of the structure shown in FIG. 2; and FIG. 8 is a view showing a modification of the structure shown in FIG. 7.

Figure 1:
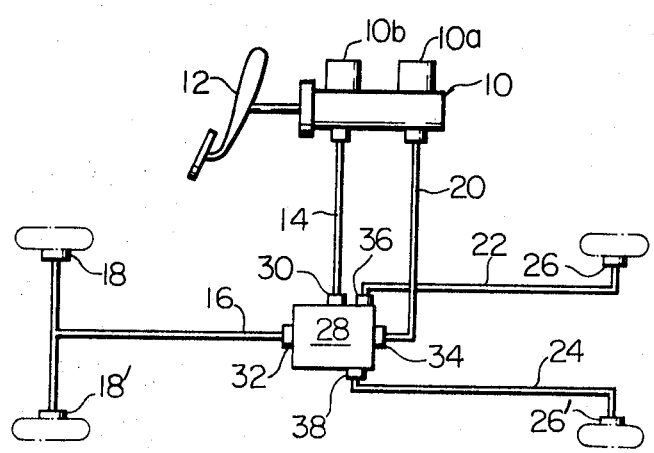
FIG. 1 is a schematic view illustrating a general arrangement of a hydraulic brake system of dual type incorporating the hydraulic brake pressure proportioning valve according to the present invention.

Referring now to the drawings and more particularly to FIG. 1, there is schematically shown a hydraulic brake fluid system of dual type incorporating the brake fluid pressure proportioning valve implementing the present invention. The brake system is shown to include a usual tandem master cylinder 10 having separate front and rear sections 10a and 10b, respectively. The front and rear sections 10a and 10b are operated simulatneously by a brake pedal 12 to deliver brake fluid through fluid lines or circuits 14 and 16 to rear brake cylinders 18 and 18' and through lines 20, 22 and 24 to front brake cylinders 26 and 26'. Between the fluid lines 14 and 16 is interposed the brake pressure proportioning valve embodying the present invention which is generally designated by reference numeral 28. The brake fluid pressure proportioning valve 28 has an inlet port 30 communicating with the fluid line 14 and an outlet port 32 communicating with the fluid line 16 leading to the rear brake cylinders 18 and 18'. The brake pressure proportioning valve 28 also has an inlet port 34 communicating with the fluid line 20 leading from the master cylinder 10a and outlet ports 36 and 38 communicating with the fluid lines 22 and 24, respectively, which communicate with the front brake cylinders 26 and 26', respectively. It should be noted that in the brake system shown in FIG. 1, the brake fluid pressure transmitted from the front section 10a of the tandem master cylinder 10 may be directly connected to the front brake cylinders by means of the fluid line 20 and the brake fluid pressure delivered from the rear brake master cylinder 10b is modulated in the brake pressure proportioning valve 28 to a lower value when the brake fluid pressure reaches a predetermined value.

The detail construction of the brake pressure proportioning valve of the present invention is illustrated in section in FIg. 2. As illustrated, the brake pressure proportioning valve 28 includes a cast metal valve body or housing 40 having formed therein first and second chambers 42 and 44 between which a cylindrical bore 45 is formed in the housing 40 at its intermediate portion.

The chamber 42 provides communication between the inlet and outlet ports 30 and 32, the inlet port 30 communicating with the fluid line 14 leading from the rear section 10b of the master cylinder 10 and the outlet port 32 communicating with the fluid line 16 leading to the rear brake cylinders 18 and 18' (see FIG. 1). As shown, the inlet port 30 is threaded so that the fluid line 14 is readily coupled to the inlet port 30. Indicated at 46 is a fitting having formed therein a fluid passageway 48 communicating with the inlet port 30 and the chamber 42. The fitting 46 also has a stem portion 50 which is tightly fitted into an opening 52 formed in the housing 40. This fitting 46 serves to sealingly interconnect the end of the fluid line 14 to the inlet port 30 of the housing 40. Similarly, the outlet port 32 is threaded so that the fluid line 16 is readily connected to the outlet port 32. A fitting 54 is provided in the outlet port 32 and has formed therein a fluid passageway 56 which provides fluid communication between the outlet port 32 and the chamber 42. The fitting 54 also has a stem portion 58 which is tightly fitted into an opening 60 formed in the housing 40. This fitting 54 functions to provide sealing connection between the end of the fluid line 16 and the outlet port 32.

It will be seen in FIG. 2 that the first chamber 42 is defined by coaxial, consecutively arranged cylindrical bores 62, 64, 66 and 68. These cylindrical bores may be conveniently formed by drilling or boring the housing 40 from its lower end. The lower end of the first chamber 42 is closed by a closure member or threaded plug 70.

The plug 70 has first and second radially extending annular shoulders 72 and 74, between which a cylindrical boss 76 is formed. The outer diameter of the boss 76 is so selected as to be suitably fitted into a cylindrical bore 78 formed in the housing 40 at its lowermost end. An O-ring 80 is positioned between the annular shoulder 74 of the plug 70 and an annular shoulder 82 formed adjacent the bore 78 of the housing 40 to prevent the leakage of the fluid out of the housing 40 past the plug 70. As shown, this plug 70 has a threaded portion which engages with corresponding threaded portion formed on the cylindrical bore 62 of the housing 40. It should be noted that the longitudinal length of the cylindrical boss 76 is determined to have a value to cause the annular shoulder 74 to assume a suitable position with respect to the position of the annular shoulder 82 of the housing for thereby appropriately pressing the '-ring 80 after the plug 70 is screwed into the housing 40.

As seen in FIG. 2, the plug 70 is also formed with a seal housing 84 and a central blind bore 86 at its upper end, the seal housing 84 and the central blind bore 86 and facing the first chamber 42. The central blind bore 86 is made coaxial with the cylindrical bore 45 so that the bores 86 and 45 serve to slidably support and guide a pressure responsive valve element or differential piston 88 having an elongated lower stem portion 90 piloted in the blind bore 86 of the plug 70. The blind bore 86 has a bottom end 86a which limits the downward movement of the lower stem portion 90 of the differential piston 88.

The lower stem portion 90 of the differential piston 88 has a first effective sectional area indicated at A and is formed with an elongated central blind opening or cavity 92 which is open at its lower end to the blind bore 86 of the plug 70. The cavity 92 is filled with atmospheric air, which is compressed by the downward movement of the differential piston 88 to reduce the compressivility of atmospheric air between the end wall of the lower stem portion of the differential piston 88 and the bottom end of the blind bore 86 of the plug 70 for thereby effecting smooth axial reciprocatory movement of the differential piston 88. The provision of the cavity 92 in the lower stem portion 90 of the differential piston 88 is reflected by a light weight to cause smooth reciprocatory movement of the differential piston 88.

A cup-type annular seal 94 is located in the seal housing 84 formed in the plug 70. The seal 94 is arranged so that an outer flange 94a thereof engages with the wall of the seal housing 84 and an inner flange 94b engages with the outer periphery of the lower stem portion 90 of the differential piston 88 to prevent the flow of fluid into the blind bore 86 of the plug 70 and the cavity 92 formed in the lower stem portion 90 of the differential piston 88 as a result of its 94a and 94b being biased outwardly. Disposed above the seal member 94 is a spring retaining member 96 which prevents the seal member 94 from being moved out of the seal housing 84 and which spring retaining member 96 will be described hereinafter in detail.

The differential piston 88 also has an upper stem portion 98 which is slidably received in the cylindrical bore 45 and which has a third effective sectional area indicated at C. Engaged with the outer periphery of the upper stem portion 98 is a Y-shaped seal member 100, which will be described hereinafter in detail. The length of the upper stem portion 98 of the differential piston 88 is determined so that even when the differential piston 88 is moved downward until the lowermost end of the lower stem portion 90 thereof abuts against the bottom end 86a of the blind bore 86 of the plug 70, the Y-shaped seal member 100 sufficiently seals off to prevent the fluid from being flown into the second chamber 44.

The differential piston 88 is formed with a valve head 102 below the upper stem portion 98 and a neck portion 104 below the valve head 102. The outer diameter of the valve head 102 is determined to have a value larger than those of upper stem portion 98 and the neck portion 104, respectively. Furthermore, the outer diameter of the valve head 102 is so determined as to be slightly larger than the inner diameter of a valve member 106 as will be described hereinafter in detail. This outer diameter of the valve head 102 will be herein referred to as a second effective sectional area which is represented by B.

The cylindrical bore 68 forming a part of the first chamber 42 is determined to have the inner diameter which is slightly larger than the outer diameter of the valve head 102 thereby to provide a fluid passage to deliver the fluid transmitted to the inlet port 30 to the outlet port 32. A radially extending annular shoulder 108 is formed on the differential piston 88 between the upper stem portion 98 and the valve head 102 to limit the upward movement of the differential piston 88 when abutting against a radially extending annular shoulder 110 formed in the housing 40 between the bores 45 and 68.

An annular portion between the valve head 102 and the neck portion 104 is formed in a rounded shaper so as to provide a valve function in association with the valve member 106. Thus, the valve head 102 functions either to permit the transmission of the fluid pressure from the inlet port 30 to the outlet port 32, or to close this fluid path and modulate the pressure at the outlet port with respect to the pressure at the inlet port 30. This is accomplished by the axial movement of the differential piston in response to the various fluid pressures acting thereupon.

The outer diameter of the neck portion 104 is selected to be slightly smaller than the inner diameter of the valve member 106 so that when the valve head 102 disengages with the valve member 106 as seen in FIG. 2 this condition will be referred to as "valve opening condition" and the reverse condition will be referred to as "valve closing condition" hereinafter, a fluid pressure path is formed by an annular spacing between the inner peripheral wall of the valve member 106 and the outer peripheral wall of the neck portion 104.

The differential piston 88 is further formed with a radially extending annular flange 112 below the neck portion 104, the annular flange 112 being provided with a radially extending annular shoulder 114 on one side thereof and a radially extending annular shoulder 116 on its other side. The annular shoulder 116 of the flange 112 serves to push up the valve member 106 in a position in which the valve member 106 is maintained in a spacing between the annular shoulder 116 and a radially extending annular shoulder 118 formed in the housing 40 between the bores 68 and 66 during valve opening condition. The outer diameter of the annular flange 112 is determined to be slightly smaller than the diameter of a lip portion of the valve member 106 to provide a gap therebetween so that a fluid pressure path is formed to transmit the fluid pressure from the inlet port 30 to the outlet port 32.

As seen from FIG. 2, the differential piston 88 is biased upwardly so that the annular shoulder 108, formed adjacent the upper end thereof just below the upper stem portion 98, abuts against the annular shoulder 110 of the housing 40. This is accomplished by means of a compression spring 120 which engages with the annular shoulder 114 of the flange 112 at its upper end and is seated against the spring retaining member 96. The spring retaining member 96 has at its lower end a cylindrical boss 122, which is fitted into the seal housing 84 of the plug 70. This spring retaining member 96 also has a retaining groove 124 at its upper face to support the lower end of the compression spring 120, the inner diameter of the retaining groove 124 being selected to be slightly larger than the outer diameter of the spring 120 to support the spring 120 in an appropriate position to prevent deflection of the spring 120.

The spring retaining member 96 is further provided with a central hole 126 having a diameter larger than the outer diameter of the lower stem portion 90. Since the upper end portion of compression spring 120 is retained by the flange 112 and the lower end portion and the lower outer peripherary of the compression spring 120 is retained by the retaining groove 124, the brake pressure proportioning valve 28 is prevented from malfunctioning because the deflection of the compression spring 120 is precluded. The deflection of the compression spring 120 can be more advantageously prevented by providing a larger diameter portion (not numbered) on the differential piston 88 just below the flange 112 to prevent greater displacement of the upper portion of the compression spring 120.

A detail construction of the valve member 106 is shown in FIGS. 3, 4, 5 and 6. As shown, the valve member 106 has a lip portion 130 which, in the free state of the valve member 106, is inclined angularly downwardly and radially outwardly. When the valve member is fitted in the first chamber 42, its lip portion 130 is deflected radially inwardly slightly by the engagement of its outer periphery with the wall of the chamber 42. This prevents the upward flow of fluid from the chamber 42 around the lip portion 130. The outer periphery of the valve member 106, above the lip portion 130, is provided with a plurality of circumferentially spaced axially extending side ribs 132 of generally oval shape. The outside diameter of the side ribs 132 is selected so that when the valve member 106 is inserted in the cylindrical bore 66, the side ribs 132 contact the wall of the bore 66. The lower surface of valve member 106 is provided with a plurality of circumferentially equally spaced semispherical projections 134 projecting downwardly from the lower side of the valve member 106. The semispherical projections 134 abut against the annular shoulder 116 of the radial flange 112 and serve as props to maintain the valve member 106 in place as shown in FIG. 2. When the annular shoulder 116 of the radial flange 112 engages with the semispherical projections 134 formed on the lower surface of the valve member 106, a fluid path is formed by spaces 136 between the projections 134 thus permitting the fluid to flow from the inlet port 30 to the outlet port 32.

The upper end of the valve member 106 is provided with a plurality of angularly equally spaced ribs 138 engageable with the annular shoulder 118 of the housing 40 and angularly aligned with the side ribs 132 to provide spaces 140 therebetween for the flow of fluid from the outlet port 32 out between the annular shoulder 118 and the valve member 106, to the spaces between the side ribs 132 formed on the outer periphery of the valve member 106. By this means, fluid pressure at the outlet port 32 can gain access to the outer periphery of the lip portion 130 so that if fluid pressure at the outlet port 32 is higher than fluid pressure at the inlet port 30 after valve closure, the outlet pressure can force the lip portion 130 radially inwardly for the reverse flow of fluid from the outlet port 32 to the first chamber 42 around the valve member 106. As best shown in FIGS. 3 and 4, the valve member 106 is formed with a rounded valve seat 142 disposed at the upper end of its inner peripheral surface 144. This valve seat 142 is engageable with the valve head 102 of the differential piston 88 upon downward movement of the piston 88 against the force of the compression spring 120.

As already noted hereinabove, the diameter of the inner peripheral surface 144 of the valve member 106 is determined to be slightly larger than the outer diameter at the neck portion 104 of the differential piston 88, thus providing an annular fluid path communicating with the spaces 136 between the semispherical projections 134 to permit the fluid to flow from the inlet port 30 to the outlet port 32 during the valve opening condition. Moreover, the diameter of the inner peripheral surface of the valve member 106 is selected to have a value such that when the valve head 102 of the piston 88 engages with the valve seat 142 of the valve member 106, the valve seat 142 is capable of sufficiently supporting the valve head and providing proper sealing function, and that if the fluid pressure at the inlet port 30 is decreased after the valve closure, the differential piston 88 is moved downward to cause the valve head 102 thereof to increase the volume at the outlet port side effectively for thereby reducing the level of the fluid pressure to be applied to the rear brake cylinders in proportion to the fluid pressure at the inlet port 30. This is satisfactorily accomplished by selecting the diameter of the inner peripheral surface 144 of the valve member 106 in such a manner that during downward movement of the lower stem portion 90 of the differential piston 88 toward the bottom end 86a of the blind bore 86 of the plug 70, the valve head 102 of the differential piston 88 engages with the inner peripheral surface 144 of the valve member 106 to keep the valve member 106 in its sealing function.

Turning now to FIG. 2, the second chamber 44 is defined by coaxial, consecutively arranged cylindrical bores 150, 152 and 154. It will be seen that an annular shoulder 154 is formed in the housing between the cylindrical bores 45 and 156 and that an annular shoulder 158 is formed between the cylindrical bores 150 and 152. As shown, the upper end of the second chamber 44 is closed by a second threaded end closure member or end plug 160 which is screwed into a partly threaded the cylindrical bore 154 of the housing 40.

The end plug 160 has first and second radially extending annular shoulders 162 and 164, between which a cylindrical boss 166 is formed. The outer diameter of the cylindrical boss 166 is so selected as to be suitably fitted into a cylindrical bore 168 formed in the housing 40 at its uppermost end. An O-ring 170 is positioned between the annular shoulder 164 of the end plug 160 and an annular shoulder 172 formed in the housing 40 adjacent the cylindrical bore 168 to prevent the leakage of fluid out of the housing 40 past the end plug 160. It should be noted that the height of the cylindrical boss 166 is selected to have a value to cause the annular shoulder 164 of the end plug 160 to assume a suitable position to appropriately press the O-ring 170 to the annular shoulder 172 of the housing 40 after the end plug 160 has been screwed into the bore 154 of the housing 40.

As seen in FIG. 2, the inlet port 34 which communicates with the fluid line 20 leading to the front section cylinder 10a (see FIG. 1) is provided in the end plug 160 at its upper end portion. The inlet port 34 is threaded so that the fluid line 20 is readily coupled to the inlet port 34. A fitting 174 is provided which has a fluid passageway 176 communicating with the inlet port 34. The fitting 174 also has a stem portion 178 which is tightly fitted into an opening 180 formed in the end plug 160. This fitting serves to sealingly interconnect the end of the fluid line 20 with the inlet port 34. The outlet ports 36 and 38, which lead to the rear brake cylinders 18 and 18' respectively (see FIG. 1), are provided in the housing 40 at its upper portion and communicate with the inlet port 34 in a manner as will be described hereinafter in detail. The outlet port 36 is threaded for the reason as previously described. A fitting 182 is provided which has a fluid passageway 184 communicating with the outlet port 36. This fitting 182 also has a stem portion 186 which is tightly fitted into an opening 188 formed in the housing 40 for the purpose as already mentioned. Similarly, the outlet port 38 is threaded for the same reason as previously noted. A fitting 190 has a fluid passageway 192 communicating with the outlet port 38 and a stem portion 194 which is tightly fitted into an opening 196 formed in the housing 40.

The end plug 160 has a longitudinally extending cylindrical portion 198 having formed therein a longitudinally extending bore or cavity 200 in which the upper stem portion 98 of the differential piston 88 is slidably disposed for the reason as will be discussed hereinafter in detail. The longitudinal bore 200 communicates with the inlet port 34 so that the front brake fluid pressure is applied on the upper end of the upper stem portion 98 of the piston 88. The end plug 160 also has a radially extending opening 202 which communicates with the cavity 200. The end plug 160 is further provided with an annular recess 204 on the outer periphery of the extension 198, the annular recess 204 being in alignment with the openings 188, 196 and 202 to provide fluid communication therebetween. The outer diameter of the longitudinal extension 198 is selected so that the extension is suitably fitted into the bore 152 of the housing 40 to prevent the axis of the end plug 160 from being deflected with respect to the longitudinal axis of the housing 40. The length of the extension 198 of the end plug 160 is selected so that when the end plug 160 is completely screwed into the housing 40 until the annular shoulder 162 of the end plug 160 abuts against the upper end surface of the housing 40, an end surface 198a of the extension 198 appropriately presses the seal member 100 to the radially extending annular shoulder 158 formed in the housing 40 by means of a thrust washer 206 which is hereinafter described in detail. Indicated at 208 is a back-up ring which prevents possible damage to the seal member 100. This back-up ring 208 is disposed in a cylindrical bore 210 coaxial with the cavity 200. The axial length and the diameter of the cylindrical bore 210 are selected in a manner as will be hereinafter described in detail.

FIG. 7 illustrates a detail construction of the seal member 100 shown in FIG. 2. As shown, the seal member 100 includes an O-ring portion 212 which functions to seal the adjacent stationary component parts from each other. The seal member 100 also includes upper and lower sealing flanges 214 and 216 which are integrally formed with the O-ring portion 212. The upper sealing flange 214 has a lip portion 214a which is inclined angularly upwardly. Similarly, the lower sealing flange 216 has a lip portion 216a which is inclined angularly downwardly. When the seal member 100 is fitted in the cylindrical bore 152, the lip portions 214a and 216a are deflected radially outwardly slightly by the engagement of their inner peripheries with the outer periphery of the upper stem portion 98 of the differential piston 88. This prevents the downward flow of fluid from the cavity 200 into the first chamber 42. It will be noted that the novel configuration of the sealing flanges 214 and 216 of the seal member 100 not only provides minimum frictional contracts but also allows proper distribution of the pressure load on the respective lip portions, thus eliminating premature wear-out of the seal member 100.

The O-ring portion 212 forms a main body or an outer periphery of the seal member 100, the outer periphery being formed in an annular shape like a usual O-ring seal. When subjected to compression by the extension 198 of the end plug 160, the O-ring portion 212 of the seal member 100 is radially outwardly deflected until the outer peripheral wall 218 thereof engages with the cylindrical bore 152 of the housing 40. When subjected to a high pressure from the cavity 200 or from the first chamber 42, the seal member 100 functions to prevent the flow of fluid into either the cavity 200 or the first chamber 42 by the actions the upper and lower sealing flanges 214 and 216. The outer diameter of the seal member 100 is such that when the outer periphery of the O-ring portion 212 abuts against the cylindrical bore 152 of the housing 40 upon compression of the O-ring portion 212, excessive inward deflection of the O-ring portion 212 is prevented to reduce the pressure acting on the upper stem portion 98 of the differential piston 88.

The outer diameter of the seal member 100 is determined by taking into consideration the other factors to be explained hereinafter in detail. As already described, the cylindrical bores 78, 62, 64, 66, 68 and 45 in the housing 40 are gradually increased in diameter from its intermediate portion toward the lower end portion thereof. Accordingly, these cylindrical bores can be readily formed in usual manners such as drilling or boring from the lower end portion of the housing 40. For this reason, the cylindrical bore 78 formed at the lowermost end of the housing is made concentric with the cylindrical bore 45 formed at the intermediate portion of the housing 40 and, consequently, the cylindrical blind bore 86 of the plug 70 may be easily maintained in concentric relationship with respect to the cylindrical bore 45 of the housing 40. On the contrary, the cylindrical bores 150, 152, 154 and 168 of the housing 40 are gradually increased in diameter from the intermediate portion of the housing 40 toward the upward direction and these bores may be formed by drilling or boring the housing 40 from its uppermost end.

A problem is encountered in this instance in that it is quite difficult to make the cylindrical bore 152 concentric with the cylindrical bore 45 and thus a slight eccentricity exists between these bores 152 and 45. For this reason, the cylindrical bore 152 is made eccentric slightly with respect to the upper stem portion 98 of the differential piston 88 supported by the cylindrical bore 45 and the blind bore 86 of the plug 70. Under this circumstance, if the diameter of the seal member 100 is larger than the inner diameter of the cylindrical bore 152, the O-ring portion 212 of the seal member 100 is compressed radially inwardly to increase the pressures of the upper and lower flanges 214 and 216 acting on the outer periphery of the upper stem portion 98 of the differential piston 88. Since, moreover, the cylindrical bore 152 of the housing 40 is slightly eccentric with respect to the upper stem portion 98 of the differential piston 88, the pressure load can not be uniformly distributed on the respective lip portions of the upper and lower flanges 214 and 216 of the seal member 100. For these reasons, the outer diameter of the seal member 100 is selected to have a value slightly less than the inner diameter of the cylindrical bore 152 of the housing 40 to compensate for the possible slight degree of eccentricity between the bore 152 and the upper stem portion 98 of the differential piston 88.

When the level of the fluid pressure below the seal member 100 is less than that of the fluid pressure above the seal member 100, the upper and lower flanges 214 and 216 are biased downwardly because of the pressure difference across the seal member 100. As this pressure difference increases excessively, the seal member 100 is damaged resulting in poor sealing function. Thus, the axial length and the diameter of the cylindrical bore 150 of the housing 40 are determined to have values to prevent the above-mentioned possible damages to the seal member 100 in a manner as will be described in detail. Namely, the diameter of the bore 150 is so selected that the clearance 220 between the bore 150 and the joint portion of the seal member 100 should be as small as possible. Similarly, the axial length of the bore 150 is so selected that the clearance 222 between the bottom surface of the lower flange 216 of the seal member 100 and the annular shoulder 156 of the housing should be as small as possible.

The O-ring portion 212 of the seal member 100 is compressed toward the annular shoulder 158 of the housing 40 by means of the extension 198 of the end plug 160 thereby providing sealing function. If the upper surface of the O-ring portion 212 of the seal member 100 directly engages with the end surface 198a of the extension 198 of the end plug 160, the O-ring portion 212 of the seal member 100 is subjected to an excessive torsional stress when the end plug 160 is screwed into the housing 40, thus resulting in a loss of proper sealing function or damages to the O-ring portion 212. To solve this problem, the thrust washer 206 is disposed between the extension 198 of the end plug 160 and the seal member 100 as already discussed hereinabove. This thrust washer 206 may be made from a suitable synthetic resin having low frictional resistance such as a fluorine containing resin so that the O-ring portion 212 of the seal member 100 is prevented from being subjected to a twisting moment by the extension 198 of the end plug 160.

As seen from FIGS. 2 and 7, the thrust washer 206 has a cylindrical bore 206a which is in alignment with the cylindrical bore 150 of the housing 40 for receiving the upper flange 214 of the seal member 100. When subjected to a high pressure from the first chamber 42, the upper and lower flanges 214 and 216 of the seal member 100 are biased upwardly so that these flanges are deflected upwardly. As the flanges 214 and 216 are deflected excessively, the seal member 100 is damaged resulting in a loss of sealing function. The diameter of the cylindrical bore 206a of the thrust washer 206 is, therefore, so selected that the clear-ance 224 between the bore 206a and the joint portion of the seal member 100 is as small as possible to satisfactorily preventing the upper flange 214 from being radially outwardly deflected.

As clearly seen in FIG. 7, the back-up ring 208 is provided which serves to satisfactorily prevent the lip portion 214a of the upper flange 214 of the seal member 100 from being damaged. The inner diameter of the back-up ring 208 is slightly larger than the outer diameter of the upper stem portion 98 of the differential piston 88 so that the back-up ring 208 is slidable on the upper stem portion 98 of the piston 88. The outer diameter of the back-up ring 208 is so selected to provide a clearance 226 between the outer periphery at the upper stem portion 98 at the piston 88 and the cylindrical bore 210 formed in the end plug 160. The thickness of the back-up ring 208 is so selected as to have a value to provide a clearance 228 between the upper surface of the back-up ring 208 and an annular shoulder 230 formed in the end plug 160 at its lower portion adjacent the cylindrical bore 210 for a reason to be discussed in detail.

The annular shoulder 230 of the end plug 160 functions to prevent the excessive upward deflection of the upper flange 214 of the seal member 100 in association with the back-up ring 208.

The cylindrical bore or cavity 200 formed in the end plug 160 has a sufficiently large diameter to permit the upper stem portion 98 of the differential piston 88 to freely move therethrough, so that the upper stem portion 98 is smoothly axially movable in the cavity 200 without contacting the inner peripheral wall thereof even when the eccentricity exists between the cavity 200 and the upper stem portion 98 of the piston 88. The back-up ring 208 is slidably movable on the upper stem portion 98 of the piston 88 even when the eccentricity exists between the cylindrical bore 210 of the end plug 160 and the upper stem portion 98 of the piston 88 due to the sufficient clearance 226 between the back-up ring 208 and the cylindrical bore 210 of the end plug 160.

It will thus be seen that the back-up ring 208 serves to prevent possible damages to the lip portion 214a of the upper flange 214 of the seal member 100 without causing difficulty in smooth movement of the upper stem portion 98 of the piston 88. It will also be noted that the lip portions 214a and 216a of the respective upper and lower flanges 214 and 216 of the seal member 100 are prevented from excessive deflection and from possible damages even when a high degree of pressure difference exists across the seal member 100 since the clearances 222 and 228 are held to proper values. The tests have shown that the seal member 100 forming an essential part of the present invention does not lose the proper sealing function even when the differential piston 88 is vibrated for a long period of time at a speed of 200 cycles per second during regulating condition of the fluid pressure to be applied to the rear brake cylinders.

A modified form of the structure shown in FIG. 7 is illustrated in FIg. 8, wherein like component parts are designated by the same reference numerals as those used in FIG. 7. In this modification, the back-up ring 208 is dispenced with and in place thereof, the thickness of the thrust washer 206 is so selected that the clearance 232 between the end surface 198a of the extension 198 of the end plug 160 and the upper flange 214 of the seal member 100 is minimum thereby to prevent excessive upward deflection of the upper and lower flanges 214 and 216 of the seal member 100 that would otherwise occur when the fluid pressure above the seal member 100 becomes lower than the fluid pressure in the first chamber 42. As previously mentioned, first and second clearances 234 and 236 between the cylindrical bore 200 and the outer periphery of the upper stem portion 98 of the piston 88 have different values due to the eccentricity therebetween even though the inner diameter of the cavity 200 is selected to have a value to provide proper clearance between the bore 200 and the outer periphery of the stem portion 98 of the piston 88. If the first clearance 234 becomes extremely small, the upper stem portion 98 of the piston 88 is caused to contact the inner periphery of the bore 200 so that the upper stem portion 98 of the piston 88 is damaged. Furthermore, as the first clearance 234 decreases, the second clearance 236 increases so that the lip portion 214a of the upper flange 214 of the seal member 100 is caused to be extruded into the second clearance 236 in the event the seal member 100 is subjected to a high pressure in upward direction. On the contrary, if the upper and lower flanges 214 and 216 of the seal member 100 are biased downwardly due to a high pressure acting in the downward direction, the lip portion 214a of the upper flange 214 is pulled out of the second clearance 236. When this phenomenon repeatedly takes place, the lip portion 214a of the upper flange 214 of the seal member 100 is damaged to lose the sealing function. This drawback can be overcome by providing a back-up ring as stated hereinabove.

When, now, the brake pedal 12 is depressed with all the fluid circuits normally operable, an increased fluid pressure which may be represented by $P_{mb}$ occurs in the inlet ports 30 and 34 leading from the rear and front sections 10b and 10a, respectively. The fluid pressure transmitted to the inlet port 30 is delivered through the chamber 42 of the brake pressure proportioning valve 28 to the outlet 32, from which the fluid pressure is applied through the fluid circuit 16 to the rear brake cylinders 18 and 18'. The fluid pressure transmitted to the inlet port 34 is passed through the opening 202 of the end plug 160 of the brake pressure proportioning valve 28 to the two outlets ports 36 and 38, from which the fluid pressure is applied through the fluid circuits 22 and 24 to the front brake cylinder 26 and 26'. Until the fluid pressure reaches a level which is predetermined by the compression of the spring 120, the differential piston 88 is held in its protruded position with the annular shoulder 108 of the valve head 102 in abutting engagement with the annular shoulder 110 of the housing 40 to cause the valve head 102 to be unseated from the valve seat 142 of the valve member 106, thus permitting the fluid pressure in the inlet port 30 to be transmitted to the outlet port 32. As the brake pedal 12 is further depressed and the fluid pressure reaches a predetermined level which may be represented by $P_{ms}$, then the differential piston 88 is moved toward the plug 70 against the force S of the compression spring 120, whereby the valve head 102 engages with the valve seat 142 of the valve member 106. Then the fluid communication between the inlet port 30 and the outlet port 32 is blocked so that the fluid pressure at the outlet port 32 no longer rises irrespective of an increase in the fluid pressure $P_{mb}$.

Now assuming that the fluid pressures developed in the front and rear sections 10a and 10b are equal to each other, A represents the effective sectional area of the lower stem portion 90 of the differential piston 88, C represents the effective sectional area of the upper stem portion 98 of the piston 88, and the fluid pressure $P_{mb}$ is lower than the predetermined level of the fluid pressure $P_{ms}$, the differential piston 88 is biased downwardly with a force $P_{mb} \cdot C + P_{mb}(A - C)$. However, this downward force exerted on the differential piston 88 is lower than the force S of the compression spring 120 so that the following relationship holds:

$$P_{mb} \cdot A < S \quad (1)$$

In this condition, the differential piston 88 is maintained in its uppermost position with its valve head 102 opening the valve member 106 so that the fluid pressure at the inlet port 30 is delivered to the outlet port 32.

As the brake pedal 12 is further depressed and the input fluid pressure $P_{mb}$ reaches a predetermined level which is represented by $P_{ms}$, then the differential piston 88 is biased downwardly with a force $P_{ms} \cdot C + P_{ms}(A - C)$. In this instance, the differential piston 88 is opposed by the force S of the compression spring 120. Since, in this condition, the force S of the compression spring 120 is lower than the downward force, the following relation exists:

$$P_s \cdot A > S \quad (2)$$

When this occurs, the differential piston 88 is moved downwardly for a distance $\Delta \chi$ so that the valve head 102 thereof engages with the valve seat 142 of the valve member 106 to block the fluid communication between the inlet port 30 and the outlet port 32. At this time, the differential piston 88 is biased downwardly with a force $P_{ms} \cdot C + P_{rs}(B - C)$. Where B represents the effective sectional area of the valve head 102, and $P_{rs}$ represents the fluid pressure at the outlet port 32 when the fluid pressure $P_{mb}$ reaches the predetermined level $P_{ms}$. At the same time, the differential piston 88 is biased upwardly with an opposing force $P_{ms}(B - A) + S_w$, where $S_w$ represents the force of the compression spring 120 where the spring 120 is compressed for the distance $\Delta \chi$ ($S_w = S + \beta \cdot \Delta \chi$, where $\beta$ represents the spring constant of the compression spring 120). Thus, when the fluid communication between the inlet port 30 and the outlet port 32 is blocked, the differential piston 88 is held in a balanced position in which $$P_{ms} \cdot C + P_{rs}(B - C) = P_{ms}(B + A) + S_w$$

hence $$P_{rs} = P_{ms} \cdot [B - (A + C)]/(B - C) + [1/B - C \cdot S_w \quad (3)$$

Since, in this condition, the fluid communication between the inlet port 30 and the outlet port 32 is blocked when the fluid pressure $P_{rs}$ at the outlet port 32 is equal to the predetermined level $P_{ms}$, that is, when $P_{rs} = P_{ms}$, the fluid pressure $P_{ms}$ is therefore written from Eq. (3) as $$P_{ms} = P_{rs} = S_w/A \quad (4)$$

From this Eq. (4) it is apparent that the predetermined level of the fluid pressure may be easily obtained by suitably determining the force $S_w$ of the compression spring 120 and the diameter of the lower stem portion 90 of the differential piston 88.

After the valve head 102 closes the valve member 106 to block the fluid communication between the inlet and outlet ports 30 and 32 and the fluid pressure at the inlet port 30 is further increased by a level $\Delta P_m$ by the action of the master cylinder 10, the increased fluid pressure will act on the differential piston 88 over its effective sectional area B less the area A. At this instant, the differential piston 88 is biased downwardly with a force $(P_{ms} + \Delta P_m) \cdot C + P_{rs}(B - C)$. The piston 88 is also biased upwardly with a force $(P_{ms} + \Delta P_m)(B - A) + S_w$. Here, the upward force is larger than the downward force. Thus, $(P_{ms} + \Delta P_m) \cdot C + P_{rs}(B - C) < (P_{ms} + \Delta P_m)(B - A) + S_w$. In this condition, the differential piston 88 is moved upwardly to reopen the valve member 106 to deliver the increased fluid pressure $\Delta P_m$ to the outlet port 32. It will be noted, however, that any of this increased fluid pressure $\Delta P_m$ delivered to the outlet port 32 creates an opposing downward force on the differential piston 88 acting downwardly on the piston 88 over the effective sectional area B. This, of course, tends to cause the valve head 102 of the piston 88 to reclose the valve member 106. The condition for equilibrium of the differential piston 88 in this condition is expressed by:

$$(P_{ms}+\Delta P_m)\cdot C + P_{rs}(B-C) = (P_{ms}+\Delta P_m)(B-A)+S_w \quad (5)$$

From this and Eq. (3), the increase in fluid pressure $\Delta P_r$ at the outlet port 32 is obtained as $\Delta P_r = \Delta P_m \cdot [B - (A+C)]/(B-C)$     (6)

From this it is apparent that the ratio of the fluid pressure is determined by the relationship of the effective sectional areas A, B and C of the differential piston 88.

When the supplied fluid pressure $P_{mb}$ is equal to or greater than the predetermined level $P_{ms}$, that is, when $P_{mb} = P_{ms}$, the fluid pressures $P_m$ and $P_r$ at the inlet port 30 and the outlet port 32, respectively, are expressed by $$P_m = P_{ms} + \Delta P_m,$$
and r $P_r = p_{rs} + \Delta P_r$.

From these and Eq. (5), the following equation is obtained:

$$P_m \cdot C + P_r(B-C) = P_m(B-A) + S_w \quad (7)$$

so that $$P_r = P_m \cdot [B - (A+C)]/(B-C) + [1/(B-C)] \cdot S_w \quad (8)$$

From Eq. (7) it will be seen that the fluid communication between the inlet and outlet ports 30 and 32 can not be established even when the fluid pressure $P_m$ is reduced by $\Delta P_m$. This is because of the fact that the fluid at the outlet port 32 is able to flow downwardly around the valve member 106 and the wall of the chamber 42 if the fluid in the chamber 42 is at a lower level.

The condition for equilibrium of the differential piston 88 in this condition is explained as follows. The differential piston 88 is biased downwardly with a force $(P_m - \Delta P_m)C + P_r(B-C)$. At the same time, the piston 88 is also biased upwardly with an opposing force $(P_m - \Delta P_m)(B-A) + S_w$. Thus, the following relationship holds:

$$(P_m - \Delta P_m) \cdot C + P_r(B-C) > (P_m - \Delta P_m)(B-A) + S_w \quad (9)$$

From the foregoing it will be apparent that the differential piston 88 is further moved downwardly in the condition as previously noted.

An important feature of the brake pressure proportioning valve implementing the present invention resides in the operation of the differential piston and the valve member associated therewith. When the fluid pressure at the inlet port 30 is reduced, the force tending to move the differential piston 88 upwardly are reduced and the piston 88 moves downwardly under the influence of the fluid pressure at the outlet port 32 as seen from Eq. (9). In this condition, the valve member 106 is strongly pressed against the annular shoulder 118 of the housing 40 between the bores 66 and 68. Under these circumstances, as the differential piston 88 moves downwardly, its valve head 102 slides within the inner peripheral surface 144 of the valve member 106, thereby increasing the available volume for the fluid at the outlet port 32 and thereby accomplishing a reduction in pressure $P_r$. Due to this downward movement of the differential piston 88, the force of the compression spring 120 is varied from a value $S_w$ to a value of $S_w + S$ and, therefore, the differential piston 88 is maintained in its balanced condition. The condition for equilibrium of the differential piston is expressed by $$(P_m - \Delta P_m) \cdot C + (P_r - \Delta P_r)(B-C)$$
$$= (P_m - \Delta P_m)(B-A) + (S_w + \Delta S) \quad (10)$$

Substitution of Eq. (8) into Eq. (9) results in $$\Delta P_r = \Delta P_m \cdot [B - (A+C)]/(B-C) + [1/(B-C)\cdot \Delta S] \quad (11)$$

From this and Eq. (6) it is apparent that the level of the fluid pressure at the outlet port 32 obtained when the supplied fluid pressure at the inlet port 30 increases beyond the predetermined level is smaller than that obtained when the supplied fluid pressure decreases to the predetermined level. It should, however, be noted that such a difference in rates of variations of the output fluid pressures is within a limited value as seen from Eq. (11) and, accordingly, the brake pressure proportioning valve with operate reliably.

The brake pressure proportioning valve of the present invention also has another important feature in that the valve member 106 serves as a check valve as will be described in detail. When the fluid pressure at the inlet port 30 is maintained at a level beyond the predetermined level, the fluid pressuree at the outlet port 32 can never be greater than the fluid pressure at the inlet port 30. This tends to cause the lip portion of the valve member 106 to be pressed against the inner wall of the first chamber 42. Consequently, the valve member 106 functions as a check valve to prevent the reverse flow of the fluid from the inlet port 30 to the outlet port 32 through between the lip portion of the valve member 106 and the inner wall of the first chamber 42.

It should be noted, however, that when the fluid pressure at the inlet port 30 reaches a level lower than the predetermined level, that is, when $P_m < P_r$ ($P_r - P_m = \Delta P$), the lip portion of the valve member 106 is deflected radially inwardly under the influence of the pressure P thereby to provide a fluid path for the flow of fluid from the inlet port 30 to the outlet port 32 so as to transmit the pressure P thereto. Thus, the fluid pressures at the inlet and outlet ports 30 and 32 become equal. If we assume the fluid pressure in this condition is $P_{mbi}$, then the forces exerted on the differential piston 88 are obtained from Eqs. (1) and (10) as follows:

$$P_{mbi} A << S_w + S,$$

so that the piston 88 is biased upwardly with a force $(S_w + S) - S$ thereby to reopen the annular passage between the valve head 102 and the valve member 106.

In the event that a failure or break takes place in the fluid circuit to the front brake unit, then the fluid pressure at the inlet port 34 reaches a zero level. In this condition, the force tending to move the differential piston 88 downwardly is expressed as:

$$P_m \times C = 0$$

From this and Eq. (7), the condition for equilibrium of the differential piston 88 in this condition is expressed as:

$$P_r(B-C) = P_m(B-A) + S_w \quad (12)$$

It follows that $$P_r = P_m \cdot [(B-A)/(B-C)] + [1/(B-C)] \cdot S_w \quad (13)$$

It will now be appreciated that Eq. (13) represents the relationship between the input and output fluid pressures where the failure takes place in the fluid circuit to the front brake unit. It is thus seen that the fluid pressure at the outlet port 32 is reduced at a rate of $(B-A)/(B-C)$. Before the pressure proportioning valve commences to proportionally reduce the fluid pressure to be obtained at the outlet port 32, the fluid pressure at the inlet port 30 is equal to the fluid pressure at the outlet port 32 and, therefore, $P_m = P_r$. From this and Eq. (12), the relationship holds:

$$P_{ms} = P_{rs} = [1/(A - C)] \cdot S_w \qquad (14)$$

If the rates of decrease in the fluid pressure at the outlet port 32 are compared by using Eqs. (8) and (13), there holds relationship:

$$[B - (A + C)]/(B - C) << (B - A)/(B - C). \qquad (15)$$

From Eqs. (4) and (13), there holds the relationship:

$$S_w/A << S_w/(A - C) \qquad (16)$$

From the foregoing it will be apparent that upon failure in the front brake hydraulic pressure system the differential piston 88 of the brake pressure proportioning valve is maintained in its uppermost position irrespective of the fluid pressure at the inlet port 30 to keep the inlet port 30 in communication with the outlet port 32 and, accordingly, the brake hydraulic pressure proportioning valve under this condition no longer acts as a valve in its usual sense but as a mere passageway of pass the fluid pressure freely from the inlet port 30 to the outlet port 32. Thus, according to a preferred embodiment of the present invention, the brake hydraulic pressure proportioning valve becomes inoperative in the event a failure in, for instance, the front brake pressure system so that the fluid pressure existing at the rear brake master cylinder is transmitted as it is to the rear brake cylinders to provide a satisfactory braking effort.

It will also be noted that the brake fluid pressure proportioning valve implementing the present invention is provided with a novel sealing structure having a long life and proper sealing function and thus the valve is highly reliable in operation.

What is claimed is:

1. In a dual hydraulic brake system having front and rear brake cylinders and a tandem cylinder having front and rear sections respectively connected through two independent fluid circuits with front and rear brake cylinders for separately actuating said front and rear brake cylinders, a brake pressure proportioning valve interposed between the tandem cylinder and the rear brake cylinders, said brake pressure proportioning valve comprising: a housing having a first inlet port communicating with said front section of said tandem cylinder and said front brake cylinders for providing constant fluid communication therebetween, a second inlet port communicating with said rear section of said tandem master cylinder, and an outlet port communicating with said rear brake cylinders; first and second chambers formed in said housing, said first chamber providing fluid communication between said second inlet port and said outlet port to pass an unmodulated fluid pressure from said second inlet port to said outlet port when a fluid pressure prevailing in said second inlet port is lower than a predetermined level, and said second chamber communicating with said first inlet port; a pressure responsive differential piston comprising a first portion exposed to a fluid pressure in said second chamber and a second portion exposed to a fluid pressure in said first chamber, said differential piston being responsive to normal changes in said fluid pressure in said first chamber for transmitting a modulated fluid pressure from said second inlet port to said outlet port when said fluid pressure in said second chamber exceeds said predetermined level and responsive to a failure in front brake fluid pressure for increasing said modulated pressure; a valve member operatively disposed in said first chamber and being cooperative with said second portion of said differential piston for restricting the flow of said fluid pressure from said second inlet port to said outlet port when said fluid pressure in said first chamber increases beyond said predetermined level; and a sealing member operatively disposed in said second chamber for sealing said second chamber from said first chamber thereby to modify the operation of said differential piston upon said failure in said front brake fluid pressure said sealing member including an O-ring portion having an outer periphery sealingly engageable with the wall of said second chamber and upper and lower flanges integral with said O-ring portion, said upper flange being inclined angularly upwardly, said lower flange being inclined angularly downwardly, and said upper and lower flanges sealingly engaging with the outer periphery of said first portion of said differential piston exposed to said fluid pressure in said second chamber.

2. In a dual hydraulic brake system having front and rear brake cylinders and a tandem cylinder having front and rear sections respectively connected through two independent fluid circuits with said front and rear brake cylinders for separately actuating said front and rear brake cylinders, a brake fluid pressure proportioning valve interposed between said tandem cylinder and said rear brake cylinders, said brake pressure proportioning valve comprising: a housing having a rear brake pressure inlet port communicating with said rear section of said tandem cylinder, and an outlet port communicating with said rear brake cylinders; first and second chambers formed in said housing, said first chamber providing fluid communication between said rear brake fluid pressure inlet port and said outlet port to pass an unmodulated fluid pressure from said second inlet port to said outlet port when a fluid pressure prevailing in said first chamber exceeds a predetermined level; an end closure member screwed into said housing for closing said second chamber and having a front brake fluid pressure inlet port communicating with said front section of said tandem cylinder and said front brake cylinders, said end closure member also having a longitudinal cylindrical extension disposed in said second chamber, said cylindrical extension having formed therein a cylindrical bore communicating with said front brake fluid pressure inlet port; a pressure responsive differential piston comprising first portion extending into said cylindrical cavity of said extension of said end closure member and exposed to a fluid pressure therein and a second portion received in said first chamber and exposed to a fluid pressure therein, said differential piston being responsive to normal changes in said fluid pressure in said first chamber for transmitting a modulated fluid pressure from said rear brake fluid pressure inlet port to said outlet port when said fluid pressure prevailing in said first chamber exceeds a predetermined level and responsive to a failure in front brake fluid pressure for increasing said modulated fluid pressure; a valve member operatively disposed in said first chamber, said valve member being cooperative with said second portion of said differential piston for restricting the flow of said fluid pressure from said rear brake fluid pressure inlet port to said outlet port when said fluid pressure in said first chamber increases beyond said predetermined level; and a sealing member operatively disposed in said second chamber for sealing said second chamber from said first chamber thereby to modify the operation of said differential piston upon said failure in said front brake fluid pressure, said sealing member including an O-ring portion having an outer periphery sealingly engageable with the wall of said second chamber and upper and lower flanges integral with said O-ring portion, said upper flange being inclined angularly upwardly, said lower flange being inclined angularly downwardly, and said upper and lower flanges sealingly engaging with the outer periphery of said first portion of said differential piston exposed to said fluid pressure in said cylindrical cavity formed in said cylindrical extension of said end closure member.

3. In a dual hydraulic brake system as claimed in claim 2, wherein said housing of said brake fluid pressure proportioning valve has a radially extending annular shoulder on the lower end portion of said second chamber, and wherein said sealing member is interposed between said extension of said end closure member and said annular shoulder.

4. In a dual hydraulic brake system as claimed in claim 3, wherein said brake fluid pressure proportioning valve further comprises a thrust washer which is disposed between said extension of said end closure member and said sealing member.

5. In a dual hydraulic brake system as claimed in claim 4, wherein said thrust washer is made from a material having a low frictional resistance.

6. In a dual hydraulic brake system as claimed in claim 4, wherein the inner diameter of said thrust washer is such that the clearance between the inner diameter of said thrust washer and the joint portion of said sealing member is minimum to prevent said upper flange of said sealing member from being excessively deflected radially outwardly.

7. In a dual hydraulic brake system as claimed in claim 6, wherein said housing of said brake fluid pressure proportioning valve has a cylindrical bore adjacent said annular shoulder into which said lower flange of said sealing member extends, the inner diameter of said cylindrical bore being such that the clearance between the inner diameter of said cylindrical bore and said joint portion of said sealing member is minimum to prevent said lower flange of said sealing member from being excessively deflected radially outwardly.

8. In a dual hydraulic brake system as claimed in claim 4, wherein said brake fluid pressure proportioning valve further comprises a back-up incomplete ring which is received in an annular recess formed in the lowermost end of said extension and slidably movable on said first portion of said differential piston, and said back-up ring engaging said upper flange of said sealing member for preventing a lip portion of said upper flange from being damaged.

9. In a hydraulic brake fluid pressure proportioning valve for use in a dual hydraulic brake system of a vehicle including front and rear brake cylinders and a tandem cylinder having front and rear sections respectively connected through two independent fluid circuits with said front and rear brake cylinders for separately actuating said front and rear brake cylinders, said hydraulic brake fluid pressure proportioning valve being adapted to be interposed between said tandem cylinder and said rear brake cylinders, and said hydraulic brake fluid pressure inlet port communicating with said rear section of said tandem cylinder and an outlet port communicating with said rear brake cylinders, first and second chambers formed in said housing, said first chamber providing fluid communication between said rear brake fluid pressure inlet port and said outlet port to pass an unmodulated fluid pressure from said rear brake fluid pressure inlet port to said outlet port when a fluid pressure prevailing in said first chamber exceeds a predetermined level, an end closure member screwed into said housing for closing said second chamber and having a front brake fluid pressure inlet port communicating with said front section of said tandem cylinder, said end closure member having a longitudinal extension disposed in said second chamber, said cylindrical extension having formed therein a cylindrical bore, said cylindrical bore communicating with said front brake fluid pressure inlet port, a pressure responsive differential piston responsive to normal changes in a fluid pressure in said first chamber for transmitting a modulated fluid pressure from said rear brake fluid pressure inlet port to said outlet port when said fluid pressure in said first chamber exceeds said predetermined level and responsive to a failure in front brake fluid pressure for increasing said modulated fluid pressure to be delivered to said outlet port, said differential piston having a first effective sectional area exposed to a fluid pressure in said rear brake pressure inlet port, a second effective sectional area exposed to a fluid pressure in said outlet port and a third effective sectional area exposed to a fluid pressure in said front brake fluid pressure inlet port, a valve member operatively disposed in said first chamber and cooperative with said second sectional area of said differential piston for restricting the flow of said fluid pressure from said rear brake pressure inlet port to said outlet port when said fluid pressure in said first chamber exceeds said predetermined level, and a compression spring disposed in said first chamber for urging said differential piston to a position in which said valve head is unseated from said valve member for permitting said rear brake pressure inlet port to communicate with said outlet port, the improvement comprising a sealing member which is operatively disposed in said second chamber for sealing said third effective sectional area from said first and second sectional areas thereby to modify the operation of said differential piston so as to increase said modulated fluid pressure to be delivered to said outlet port upon said failure in said front brake pressure, said sealing member including an annular O-ring portion which is interposed between an annular shoulder formed in said second chamber of said housing and said cylindrical extension of said end closure member, an upper flange integral with said O-ring portion and having a lip portion angularly inclined angularly upwardly and a lower flange portion integral with said O-ring portion and having a lip portion angularly inclined angularly downwardly, said lip portions of said upper and lower flanges sealingly engaging said third effective sectional area of said differential piston.

* * * * *